United States Patent
Lee et al.

(10) Patent No.: US 8,781,732 B2
(45) Date of Patent: Jul. 15, 2014

(54) APPARATUS AND METHOD FOR RECOGNIZING POSITION OF MOVING OBJECT

(71) Applicant: Electronics and Telecommunications Research Institute, Daejeon (KR)

(72) Inventors: Yu-Cheol Lee, Daejeon (KR); Sung Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 105 days.

(21) Appl. No.: 13/711,747

(22) Filed: Dec. 12, 2012

(65) Prior Publication Data

US 2013/0304374 A1    Nov. 14, 2013

(30) Foreign Application Priority Data

Dec. 22, 2011    (KR) .......................... 10-2011-0140122

(51) Int. Cl.
*G01C 21/26*    (2006.01)
*G06F 19/00*    (2011.01)

(52) U.S. Cl.
USPC ....................... 701/445; 701/436; 340/995.25

(58) Field of Classification Search
USPC ................. 701/455, 436, 408, 412, 469; 340/995.25, 995.28; 342/357.24; 455/152.1
See application file for complete search history.

(56) References Cited

U.S. PATENT DOCUMENTS

| | | | |
|---|---|---|---|
| 8,239,131 B2 * | 8/2012 | Kindo et al. | 701/436 |
| 2005/0086000 A1 * | 4/2005 | Tsuchiya et al. | 701/211 |
| 2007/0055443 A1 * | 3/2007 | Sumizawa et al. | 701/209 |
| 2010/0121518 A1 * | 5/2010 | Tiernan et al. | 701/26 |
| 2010/0161192 A1 * | 6/2010 | Nara et al. | 701/70 |
| 2010/0161224 A1 | 6/2010 | Lee et al. | |

FOREIGN PATENT DOCUMENTS

| | | |
|---|---|---|
| JP | 10-206174 A | 8/1998 |
| KR | 10-0169647 B1 | 10/1998 |
| KR | 10-2010-0073190 A | 7/2010 |
| KR | 10-2011-0035258 A | 4/2011 |
| KR | 10-2011-0089880 A | 8/2011 |
| SG | 174849 A1 | 11/2011 |

* cited by examiner

*Primary Examiner* — Tan Q Nguyen
(74) *Attorney, Agent, or Firm* — Rabin & Berdo, P.C.

(57) ABSTRACT

An apparatus for recognizing a position of a moving object includes a sensor information collector to collect sensor information associated with movement of the moving object, a camera to capture a front image based on the movement of the moving object, and a GPS receiver configured to receive a GPS position of the moving object. Further, the apparatus includes a location recognizer to display N number of particles, each of which indicates a candidate position of the moving object, in a certain region about a GPS location of the moving object on a map. The location recognizer then updates a location of the particles based on the movement of the moving object, and progressively reduces number of particles on the basis of accuracy of the position-updated particles, thereby recognizing the position of the moving object.

18 Claims, 6 Drawing Sheets

APPARATUS AND METHOD FOR RECOGNIZING POSITION OF MOVING OBJECT

RELATED APPLICATION(S)

This application claims the benefit of Korean Patent Application No. 10-2011-0140122, filed on Dec. 22, 2011, which is hereby incorporated by reference as if fully set forth herein.

FIELD OF THE INVENTION

The present invention relates to recognition of locations of a moving object which travels outdoors, and more particularly, to an apparatus and method for accurately recognizing a location of a moving object outdoors and continuously tracking the location.

BACKGROUND OF THE INVENTION

Recently, with the advancement of robot technology, technical fields using robots are diversified. In the fields, the demand for robots and self-driving vehicles which travels outdoors increases progressively. Particularly, in robots and self-driving vehicles, advanced countries such as the USA and Japan lead the advancement of technology associated with outdoor autonomous running through various events.

However, the reason that outdoor self-driving vehicles and robots are not widely used by general users is because the self-driving vehicles and the robots cannot actually show high-level performance the user desires.

Especially, it is very important to accurately measure locations of a self-driving vehicle and a robot which travels outdoors. However, even though expensive equipment such as RTK-DGPS, LIDAR, and INS are used, the performance of the equipment is restricted in some areas. Also, even though the location of a robot is accurately estimated using an expensive positioning sensor, the sensor is too expensive for general users to use.

For this reason, it is required to develop a method that accurately estimates the location of a moving object by using a low-cost sensor.

SUMMARY OF THE INVENTION

In view of the above, the present invention provides an apparatus and method for accurately recognizing a location of a moving object outdoors by using a low-cost sensor.

In accordance with a first aspect of the present invention, there is provided an apparatus for recognizing a position of a moving object, the apparatus including: a sensor information collector configured to collect sensor information associated with movement of the moving object; a camera configured to capture a front image based on the movement of the moving object; a GPS receiver configured to receive a GPS position of the moving object; a map storage configured to provide map data of an area in which the moving object is located; and a location recognizer configured to display N number of particles, each of which indicates a candidate position of the moving object, in a certain region about the GPS location of the moving object on the map, update a location of the particles based on the movement of the moving object, and progressively reduce number of particles on the basis of accuracy of the position-updated particles to recognize the position of the moving object.

Preferably, the position recognizer primarily removes a particle, deviating from a road, from among the particles displayed on the map, updates positions of left particles on the basis of a relative position and a direction angle in which the moving object has moved, secondarily removes a particle deviating from the road, updates positions and accuracy of left particles by using the image, GPS position, and map data, and duplicates particles about a particle having a highest accuracy such that total number of particles again becomes N number.

In accordance with a second aspect of the present invention, there is provided a method of recognizing a position of a moving object, the method including: collecting sensor information associated with movement of the moving object; receiving a GPS position of the moving object and a front image based on the movement of the moving object; displaying N number of particles in a certain region about the GPS position of the moving object on the map, each of the particles indicating a candidate position of the moving object; and updating a position of the particles based on the movement of the moving object by using the sensor information, the image information, and map data, and recognizing the position of the moving object on the basis of accuracy of the position-updated particles.

Preferably, the recognizing the position of the moving object includes: primarily removing a particle, deviating from a road, from among the particles displayed on the map; updating positions of left particles on the basis of a relative position and a direction angle in which the moving object has moved; secondarily removing a particle deviating from the road; updating positions and accuracy of left particles by using the image information, the GPS position, and the map data; and duplicating particles about a particle having a highest accuracy such that total number of particles again becomes N number.

Preferably, a position of each of the particles is updated by a position and a direction angle in which the moving object has moved.

Preferably, the sensor information includes information derived from an encoder and acceleration sensor mounted on the moving object.

Preferably, the map data includes traffic markings on a road in which the moving object moves, the traffic markings being extracted from the image.

Preferably, the particles are randomly scattered in a predetermined region about the GPS position of the moving object, on the map.

Preferably, the certain region is tetragonal or circular in shape.

Preferably, the moving object is a robot or a self-driving vehicle.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
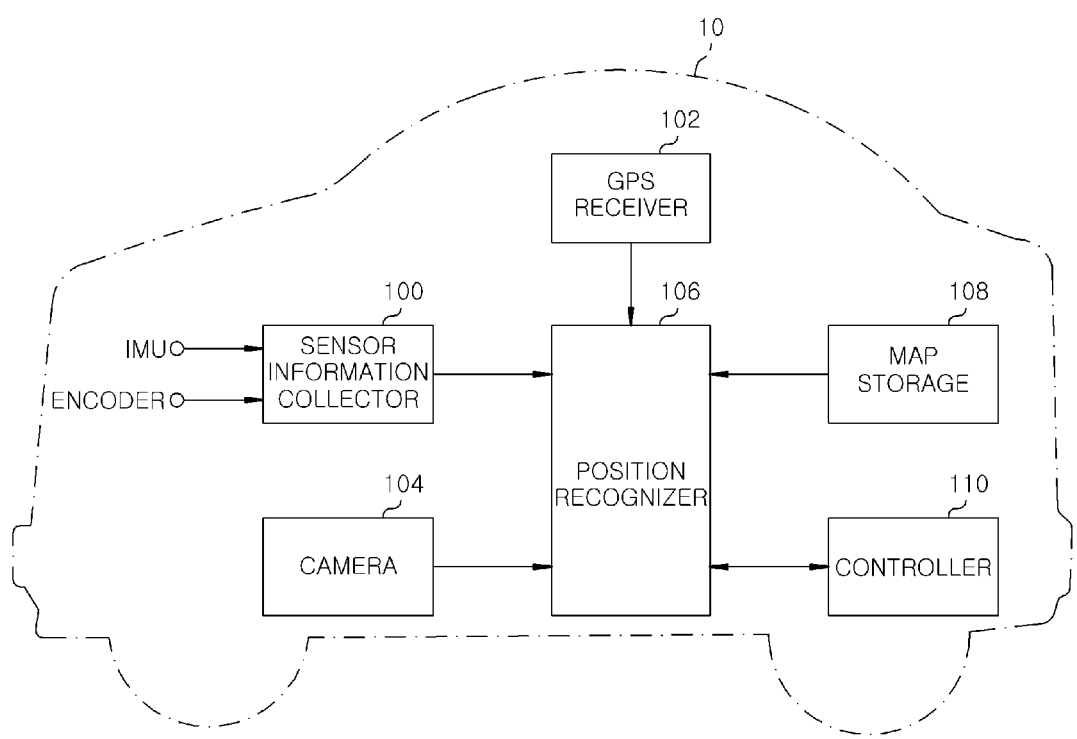
FIG. 1 illustrates a block diagram of an apparatus for recognizing a location of a moving object, in accordance with an embodiment of the present invention.

FIG. 1 is a block diagram illustrating an apparatus for recognizing a position of a moving object, in accordance with an embodiment of the present invention.

Referring to FIG. 1, the position recognition apparatus includes a sensor information collector 100, a camera 104, a GPS receiver 102, a controller 110, a position recognizer 106, and a map storage 108.

In an embodiment of the present invention, a moving object 10 may be a robot or a self-driving vehicle which travels outdoors, and the moving-object position recognition apparatus may be mounted on the moving object.

The sensor information collector 100 collects sensing information, associated with movement of the moving object 10, from a variety of sensors, for example, an inertial measurement unit (IMU) and an encoder which are mounted on the moving object 10. The inertial measurement unit may be an accelerometer. The sensing information from the IMU may be acceleration information of the moving object 10, and the sensing information from the encoder may be movement information of the moving object 10 wherein the movement information is derived from the wheel revolution of the moving object 10 which is converted by the encoder into a pulse signal.

The camera 104 may be installed at a front portion of the moving object 10. The camera 104 captures the front view image of the moving object 10 based on movement such as running of the moving object, extracts a distance between the moving object 10 and a lane, and angle information from the captured image. The extracted lane distance and the angle information are supplied to the position recognizer 106. The GPS receiver 102 receives position information of the moving object 10 from global positioning system (GPS) satellites, and supplies the position information to the position recognizer 106.

The map storage 108 stores map data on entire areas over which the moving object 10 travels and supplies map data on an area, linked to a position of the moving object, to the position recognizer 106.

The controller 110 controls an overall operation for position recognition based on movement of the moving object 10.

The position recognizer 106 overall performs a position recognition operation based on movement of the moving object 10 according to a control program which may be installed in the controller 110 for position recognition.

In detail, the position recognizer 106 collects various sensing information, which is necessary for recognizing the position of the moving object 10, from the sensors such as the IMU and the encoder which are mounted on the moving object, through the sensor information collector 100. Further, the position recognizer 106 collects GPS information, and collects traffic marking information, such as a lane and a stop line, from the camera 104.

Figure 3:
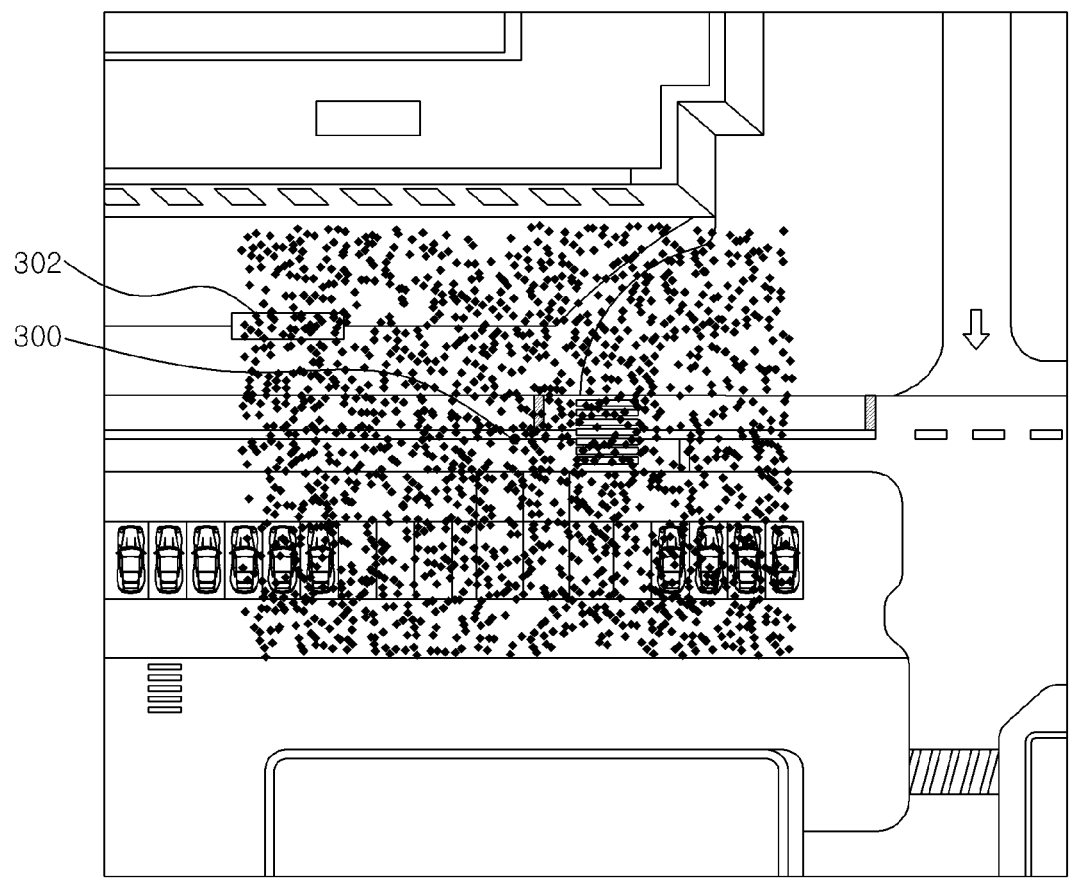
FIG. 3 is a diagram showing an exemplary local map having particles for estimating a location of a moving object, in accordance with an embodiment of the present invention.

The position recognizer 106, as shown in FIG. 3, randomly scatters N number of particles within a certain range about the position of the moving object 10 in a grid map. Each of the particles is used to indicate a candidate position of the moving object 10, and thus, a position of each particle becomes a position which may be determined as the position of the moving object 10. The position recognizer 106 primarily removes a particle which is out of a road on the grid map and cannot become the position of the moving object 10.

Further, the position recognizer 106 updates the position of each particle by a position and an angle, in which the moving object 10 has moved, on the basis of a relative position (ΔX, ΔY) and a direction angle "Δθ" in which the moving object 10 has moved, by using information inputted from the encoder and the IMU. Subsequently, the position recognizer 106 secondarily removes a particle which is out of a road on the grid map and cannot become the position of the moving object 10.

Subsequently, the position recognizer 106 updates the position and accuracy of each particle on the basis of image obtained from the camera 104, the GPS information, and lane information and stop line information included in map data. For example, the position recognizer 106 increases the accuracy of a particle suitable for the lane information and a moving trace of a GPS, and decreases the accuracy of a particle unsuitable for the lane information and the moving trace of the GPS.

Subsequently, the position recognizer 106 duplicates and disperses particles about a particle having the highest accuracy such that the total number of the particles becomes N number, thereby securing robustness of the position of the moving object 10.

Figure 2:
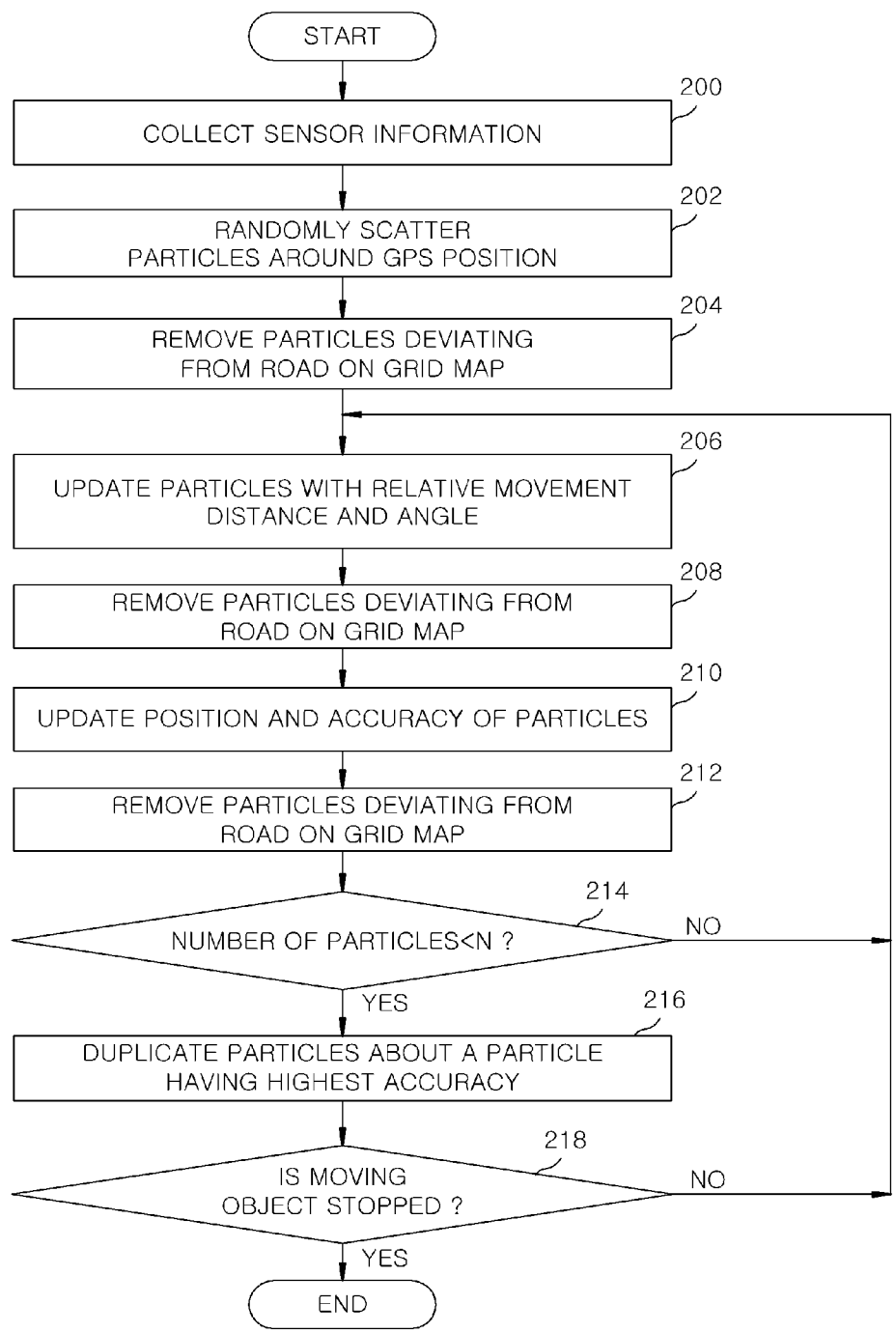
FIG. 2 is a flowchart describing an operation of recognizing a location of a moving object, in accordance with an embodiment of the present invention.

FIG. 2 is a flowchart for describing an operation of recognizing the position of the moving object, in accordance with an embodiment of the present invention.

First, by controlling the sensor information collector 100 the position recognizer 106 collects sensor information based on movement of the moving object 10, from the sensors such as the IMU and the encoder which are mounted on the moving object 10 such as a robot or a vehicle. Also, the position recognizer 106 collects GPS position information via the GPS receiver 102 and collects various sensing information, which includes a traffic lane and an image on an ambient environment in a direction to which the moving object 10 moves, necessary for recognizing the position of the moving object 10 through the camera 104, in operation 200.

Subsequently, the position recognizer 106 reads map data on an area, in which the moving object 10 is located, from the map storage 108 on the basis of a GPS position of the moving object, and randomly scatters N number of particles around a certain range about the GPS position on a map. In this regard, N is a constant such as five hundreds or hundred, and may be arbitrarily set by a user, and thus the accuracy of each particle is set to 1/N.

FIG. 3 shows that particles have arbitrarily been scattered around the GPS position, in a tetragonal region. Particles may be arbitrarily scattered in a circular region instead of the tetragonal region. In FIG. 3, reference numeral 300 indicates the GPS position of the moving object 10, and reference numeral 302 indicates the particles. The GPS position and the particles are candidates which may be determined as the current position of the moving object 10. Here, each particle 302 is composed of the position (X, Y) and direction angle θ of the moving object 10.

Figure 4:
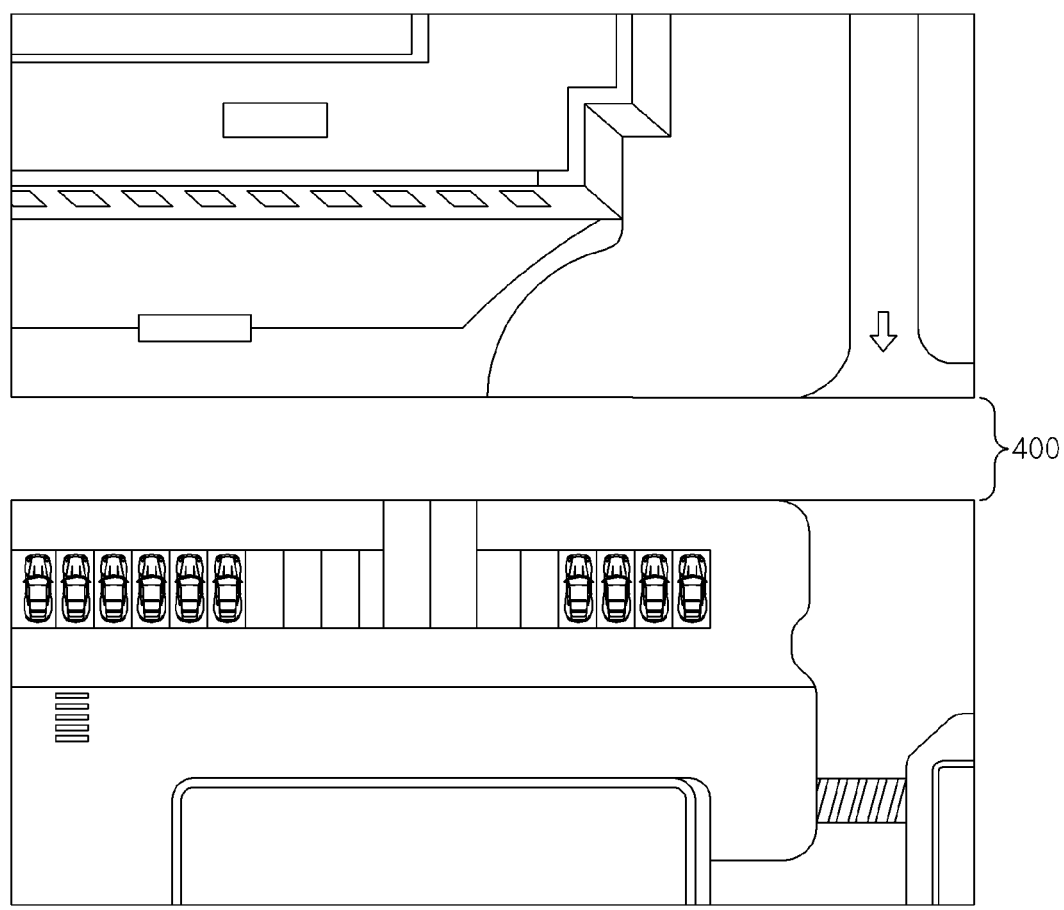
FIG. 4 is a diagram showing an exemplary grid map for estimating a location of a moving object, in accordance with an embodiment of the present invention.

Subsequently, the position recognizer 106 reads grid map data as shown in FIG. 4 on an area, in which the moving object 10 is located, from the map storage 108 on the basis of the GPS position, and primarily removes a particle which is out of a road 400 on the grid map and cannot become the position of the moving object 10, in operation 204. In the grid map of FIG. 4, the road 400 may be discerned by simply and directly editing only a corresponding region in an aerial photograph, and may be written using a laser scanner.

Figure 5:
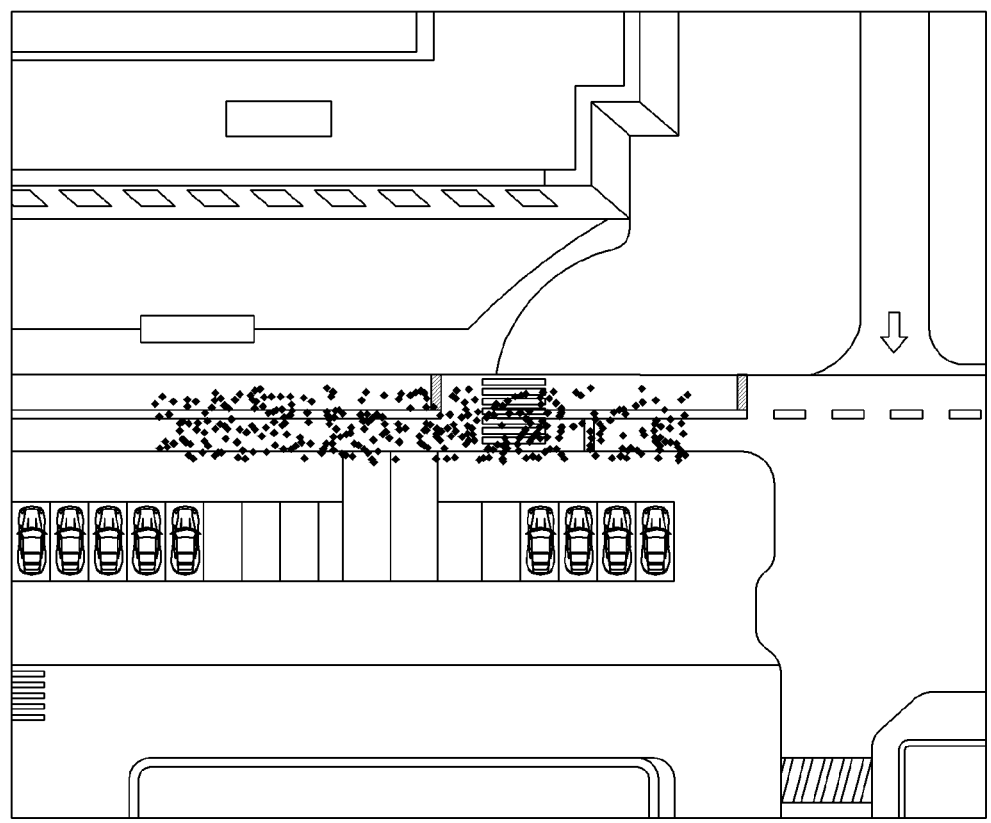
FIG. 5 is an exemplary diagram in which particles have been removed except a road region, in accordance with an embodiment of the present invention.

FIG. 5 shows that particles deviating from the road 400 on the grid map of FIG. 4 have been removed from FIG. 3.

Subsequently, the position recognizer 106 updates a position and an angle of each particle, on the basis of a relative position ($\Delta X$, $\Delta Y$) and direction angle $\Delta\theta$ in which the moving object 10 has moved, by using information inputted from the encoder and the IMU in operation 206. The position recognizer 106 then secondarily removes a particle which is out of a road on the grid map and cannot become the position of the moving object 10 in operation 208.

Subsequently, the position recognizer 106 extracts traffic markings, such as a traffic lane and a stop line, from an image obtained from the camera 104, matches the extracted traffic markings with the position of the particles by using information provided through a topological map and the relative moving trace of the GPS, thereby updating the accuracy of the particles in operation 210. In other words, the position recognizer 106 increases the accuracy of the particles suitable for the traffic lane and the moving trace of the GPS, and decreases the accuracy of a particle unsuitable for the traffic lane and the moving trace of the GPS. In this case, the position recognizer 106 may estimate the position of the moving object 10 on the basis of the positions of the best matched particles.

In operation 212, the position recognizer 106 thirdly removes a particle, which is out of the road 400 on the grid map and cannot become the position of the moving object 10, with respect to the estimated position of the particle.

Figure 6:
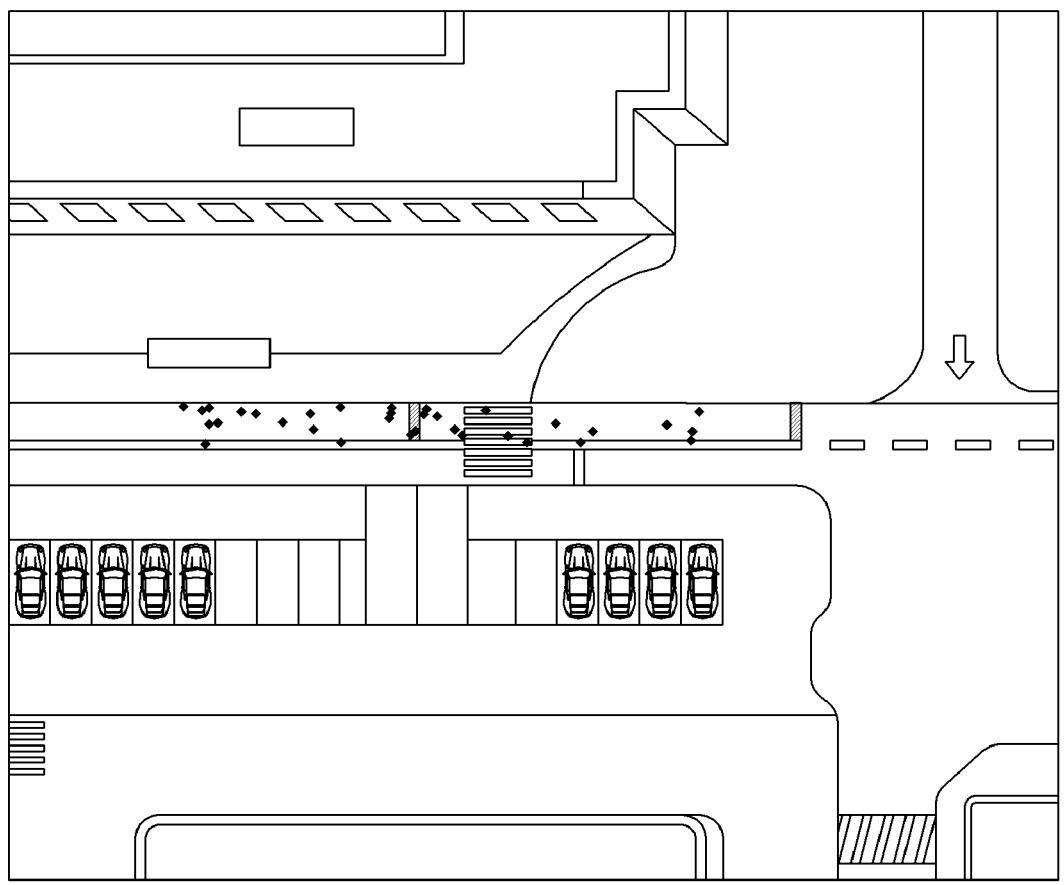
FIG. 6 is an exemplary diagram in which locations and accuracy of particles have been updated, in accordance with an embodiment of the present invention.

FIG. 6 shows that particles deviating from the road 400 on the grid map have been removed from among the particles of FIG. 5 by estimating the positions of particles on the basis of the lane information and the moving trace of the GPS.

As described above, when the position of the moving object 10 is estimated, the position recognizer 106 checks whether the number of the particles, which are left the map in which the moving object 10 is located on the basis of the GPS position, is less than N number in operation 214. When the number of the particles left on the map is less than N number, the position recognizer 106 duplicates particles about a particle having the highest accuracy such that the total number of particles becomes N number, in operation 216.

Subsequently, the position recognizer 106 checks whether the moving object 10 stops in operation 218, and, when the moving object 10 stops, the position recognizer 106 ends the position recognition operation.

However, if the moving object 10 does not stop, the position recognizer 106 returns to operation 206 and repeats the above-described operations. Through such repetition, the initial position of a moving object can be accurately detected irrespective of the location of the moving object, and the moving trace of the moving object can be robustly estimated accordingly.

As described above, in recognizing the position of a moving object 10 such as a robot or a self-driving vehicle, the present invention displays N number of particles, which may be determined as the position of the moving object, around a certain region about a GPS position of the moving object on a map, updates the position of a particle based on movement of the moving object by using sensor information, image information, and topological map data associated with movement of the moving object, and estimates the position of the moving object about a particle having the highest accuracy on the basis of the accuracy of the updated particles, thus accurately recognizing the position of the moving object independently from the use of low-cost sensors. That is, the present invention displays a particle, which is capable of corresponding to the position of a moving object 10 such as a robot or a self-driving vehicle, in a certain region on a map, and probabilistically selects a particle, which is the best matched with sensor information and map data, from among a plurality of particles, thus increasing accuracy for determining the position of the moving object. In this way, the embodiment robustly estimates the position of a moving object in the probabilistic scheme, and thus can accurately obtain the position of the moving object even using a low-cost GPS receiver and a low-cost image sensor.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for determining a position of a moving object, the apparatus comprising:
   a sensor information collector configured to collect sensor information associated with movement of the moving object;
   a camera configured to capture a front view image of the moving object based on the movement of the moving object;
   a global positioning system (GPS), receiver configured to obtain a tentative position of the moving object;
   a map storage configured to provide map data of an area in which the moving object is located; and
   a position recognizer configured to select a plurality of candidate positions for the moving object in a region of the area around the obtained tentative location of the moving object, to update the candidate positions in accordance with the movement of the moving object, and to repeatedly remove ones of the candidate positions that are located outside a travelable region of the area.

2. The apparatus of claim 1, wherein the position recognizer is configured to update the candidate positions using the front view image, the tentative position, and the map data.

3. The apparatus of claim 1, wherein the position recognizer is configured to update the candidate positions using a relative position of the moving object and a direction angle in which the moving object has moved.

4. The apparatus of claim 1, wherein the sensor information comprises information derived from an encoder and an acceleration sensor mounted on the moving object.

5. The apparatus of claim 1, wherein the map data comprises traffic markings of a road on which the moving object moves, the traffic markings being extracted from the front view image.

6. The apparatus of claim 1, wherein the selected candidate positions are randomly scattered in the region about the tentative position of the moving object on the map.

7. The apparatus of claim 1, wherein the region is tetragonal or circular in shape.

8. The apparatus of claim 1, wherein the moving object is a robot or a self-driving vehicle.

9. The apparatus of claim 1, wherein the position recognizer is configured to double a number of existing candidate positions when the number is below a threshold.

10. A method of determining a position of a moving object in an area in which the moving object travels, the method comprising:
- collecting sensor information associated with movement of the moving object;
- obtaining a tentative position of the moving object in the area and a front view image of the moving object based on the movement of the moving object;
- selecting a plurality of candidate positions for the moving object in a region of the area around the tentative position of the moving object; and
- updating the candidate positions in accordance with the movement of the moving object using the sensor information, information of the front view image, and map data of the area, and repeatedly removing ones of the candidate positions that are located outside a travelable region of the area.

11. The method of claim 10, wherein said recognizing the position of the moving object comprises:
- updating the candidate positions using the front view image information, the tentative position, and the map data.

12. The method of claim 10, wherein the updating includes updating the candidate positions using a relative position of the moving object and a direction angle in which the moving object has moved.

13. The method of claim 10, wherein the sensor information comprises information derived from an encoder and an acceleration sensor mounted on the moving object.

14. The method of claim 10, wherein the map data comprises traffic markings of a road on which the moving object moves, the traffic markings being extracted from the front view image.

15. The method of claim 10, wherein the selected candidate positions are randomly scattered in a the region about the tentative position of the moving object on the map.

16. The method of claim 10, wherein the region is tetragonal or circular in shape.

17. The method of claim 10, wherein the moving object is a robot or a self-driving vehicle.

18. The method of claim 10, wherein the updating includes doubling a number of existing candidate positions when the number is below a threshold.

* * * * *